May 22, 1928. 1,670,894

V. LORCZAK

EXPRESSING MACHINE

Filed June 17, 1925  3 Sheets-Sheet 1

INVENTOR
Viktor Lorczak
BY J. J. Brandenburg
his ATTORNEY

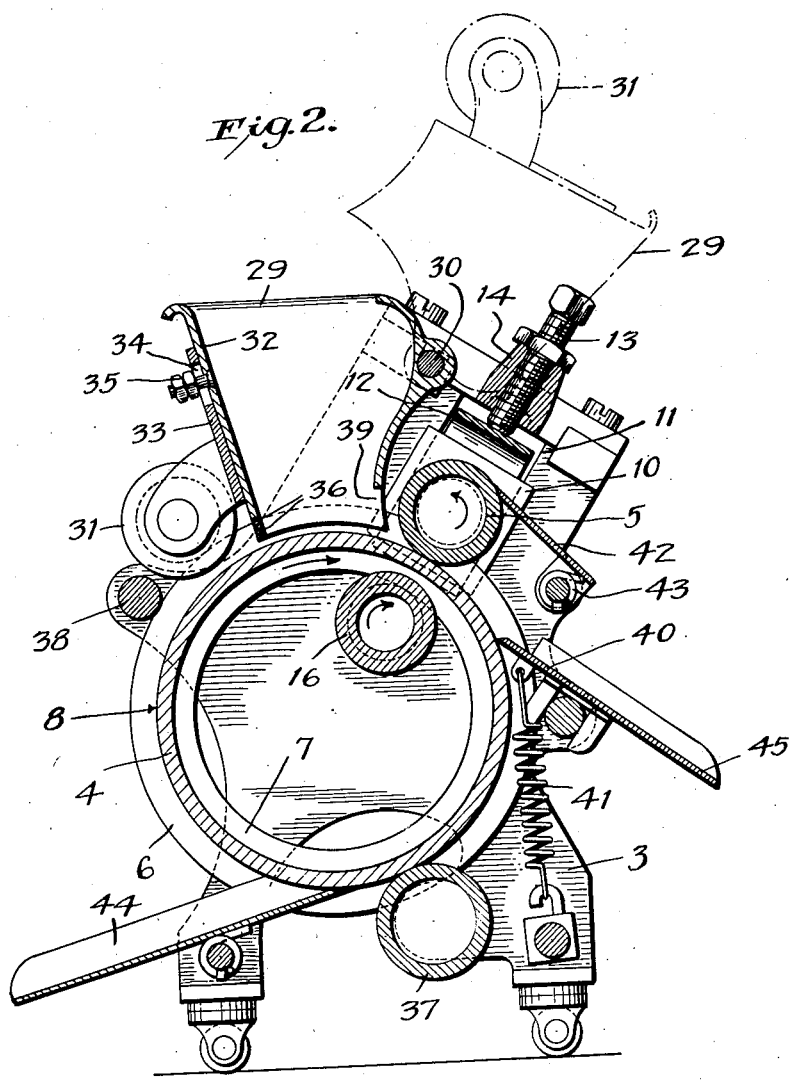

May 22, 1928.　　　　　　　　　　　　　　　　　　　1,670,894
V. LORCZAK
EXPRESSING MACHINE
Filed June 17, 1925　　　3 Sheets-Sheet 3
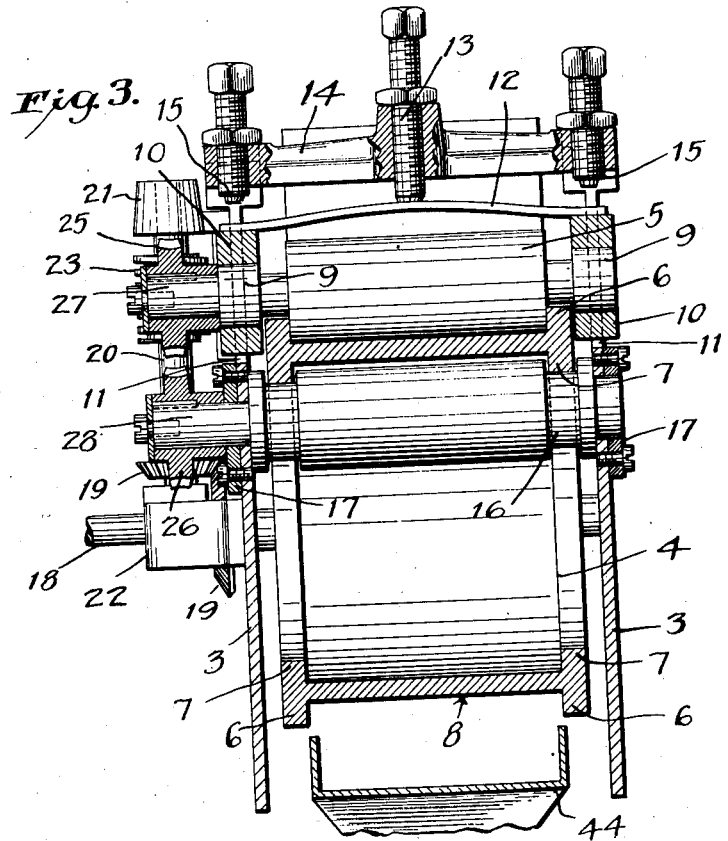
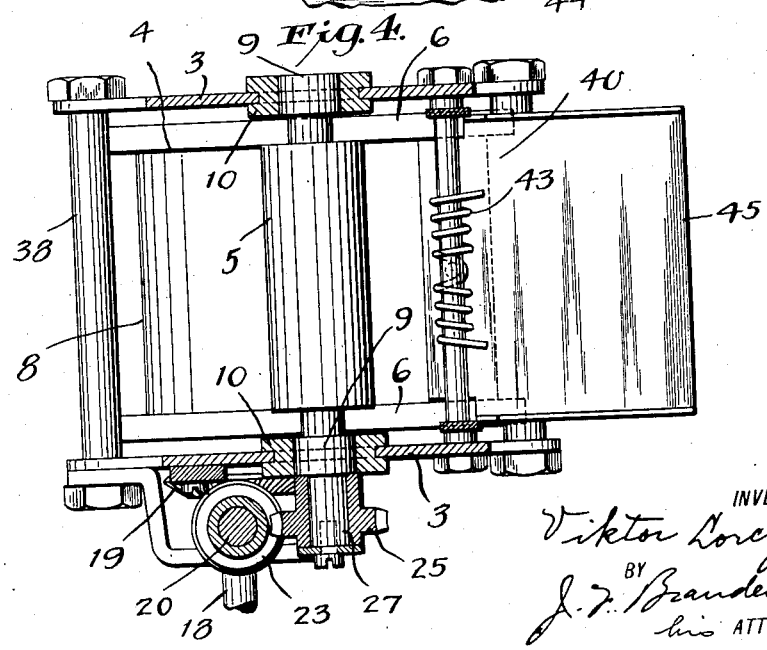
INVENTOR
Viktor Lorczak
BY J. F. Brandenburg
his ATTORNEY Patented May 22, 1928.

1,670,894

UNITED STATES PATENT OFFICE.

VIKTOR LORCZAK, OF JERSEY CITY, NEW JERSEY.

EXPRESSING MACHINE.

Application filed June 17, 1925. Serial No. 37,626.

The invention relates to apparatus for expressing juice from fruit or vegetables, or liquid from other material, and comprises an improved rotary fruit-press or mill, or like machine, the purpose of which is to enable such operations to be performed in a particularly efficient and satisfactory manner. In this machine the material to be expressed is placed through a suitable hopper upon the upper convex side of a large rotary drum or cylinder, and is carried between this drum and an expressing roll which bears upon the upper side of the drum, preferably at a region somewhat below and in front of the top as the drum is rotated. The juice or liquid, confined laterally by ledges, escapes back over the top of the drum, and under or through an adjustable back wall. The drum is driven frictionally by and between the expressing roll and an internal roller or rollers. These and other features of the invention will become apparent as the specification proceeds, and will be more particularly pointed out in the claims.

In the accompanying drawings, forming part hereof:

Fig. 2 is a central vertical section at right angles to the axes of rotation;

Fig. 3 is a section on the line 3—3 of Fig. 1; and

Fig. 4 is a section on the line 4—4 of Fig. 1.

Figure 1:
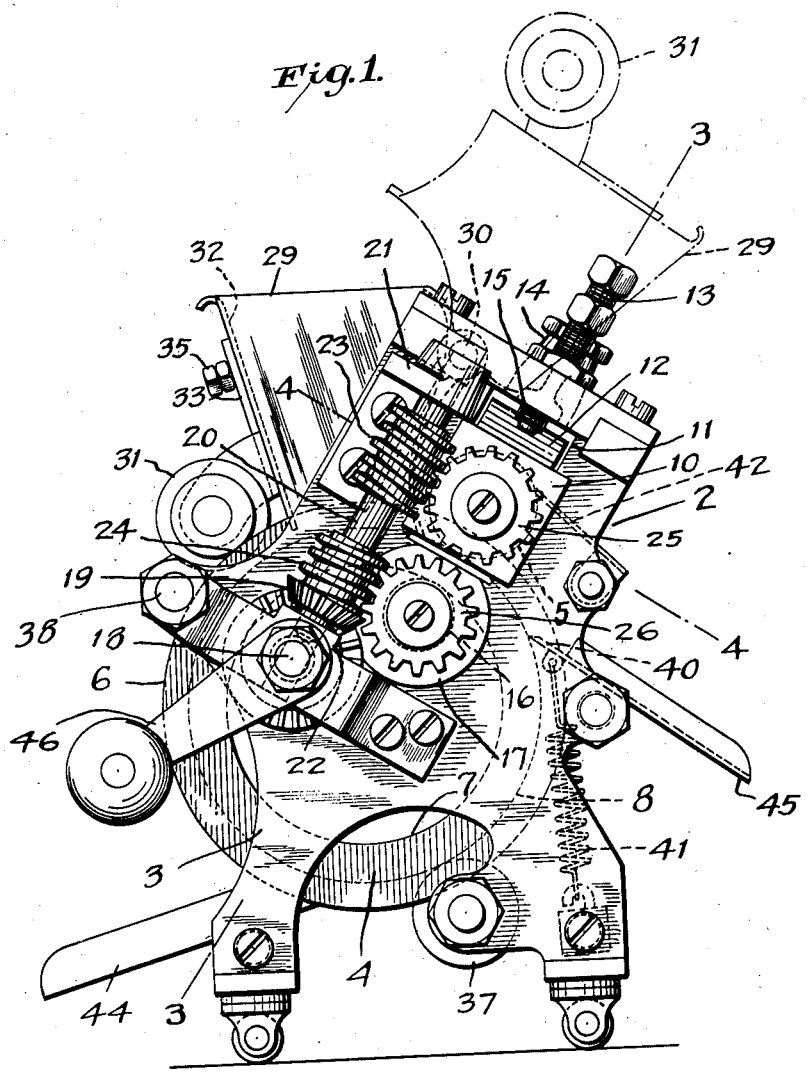
Fig. 1 is a side elevation of a machine embodying the invention, the hopper being shown in normal position in full lines, and moved out of the way in broken lines.

The machine has a frame 2, which may be fixed or may be equipped with rollers so that it may be moved about. The frame comprises side members 3, 3, between which the large-diameter cylinder or drum 4 and the small-diameter expressing roll 5 are mounted to turn in opposite directions about horizontal axes. The drum 4 is hollow and open at its sides, and is made or provided with external lateral confining flanges 6 and with internal track flanges 7. The fruit or other material is squeezed between the smooth convex outer surface 8 of the drum and the smooth surface of the roll 5, which is received between the ledges 6 extending completely across the space between them.

The journals 9 of the roll 5 are mounted in movable bearings 10, which are slidable radially of the drum in guides 11 in the forward upward portions of the side frames. Said bearings are pressed toward the drum by the ends of a leaf spring 12, the pressure of which is determined by a center screw 13 threaded through a cross-bar 14. The expressing roll is thereby urged powerfully against the drum, and the extent to which it may yield away from the drum can be regulated by stop screws 15.

The drum 4 is held and driven between the frictional grip of the expressing roll 5, and an internal driving and supporting roller 16 journaled in fixed bearings 17 in the frame, the roller 16 cooperating with the internal track flanges 7. The roll 5 and the roller 16 are driven in opposite directions from a driving shaft 18, driving by bevel gears 19 a worm shaft 20 journaled in bearing brackets 21, 22 alongside one of the side members 3 of the frame, this shaft having right and left-hand worms 23, 24 which mesh with worm-wheels 25 and 26 on end extensions 27 and 28 of the roll 5 and the roller 16, respectively. Other suitable forms of gearing may be employed.

A hopper 29 is mounted in the frame over the upper convex side of the drum, preferably substantially at or embracing the top region. This hopper is advantageously hung on pivots 30 in the upper part of the frame, so that it may be swung away from the drum, as shown by broken lines in Figs. 1 and 2, and it is supported in normal relation to the drum by the aid of wheels 31, carried by the hopper and resting upon the annular flanges 6. The open lower end of the hopper is received closely between the flanges 6 in close proximity to the surface 8 of the drum, and the proximity of the mouth of the hopper and more particularly of the lower edge of the back wall 32 to the drum, is adjustable by shifting the bracket 33, which carries the wheels 31 up or down on the back of the hopper, this adjustment being permitted by a slotted connection 34, which is clamped in the desired position by nuts 35. The lower portion of the back wall 32 is perforated at 36 to permit the escape of the juice or liquid while retaining the solid matter.

The drum 4 is preferably supported at the bottom on an idle roller or rollers 37 and a cross member 38 at the back will oppose any material tendency for upward or rearward displacement of the drum. The wheels 31 carried by the hopper and bearing upon the ledges of the drum insure that the desired relation between the lower end of the wall 32 and the drum will be preserved irrespective of any eccentric movement of the drum that may occur during the operation of the machine.

The expressing roll 5 is located directly in front of the hopper, the front wall of which is cut away at the bottom as indicated at 39. The line where the roll and drum contact is therefore somewhat below and in front of the top of the drum, the drum being rotated in the direction indicated by the arrow. In a machine of the relative proportions shown, the expressing roll is advantageously placed about 30° in advance of the top, though this may be varied. In some cases the expressing roll might be quite close to the top. The flanges 6 are of such radial width or height that the juice can not overflow laterally behind the expressing roll and must escape backward over the drum, beneath and through the wall 32. The idle rollers 37, cross-member 38 and the expressing roller 5 and internal roller 16, constitute means frictionally contacting with the cylinder of the drum for freely supporting the drum on its cylinder in said frame, so that the drum will rotate about its horizontal axis. This method of supporting the drum and the pivoted arrangement of the hopper 29 in connection therewith are important features of the machine. Due to the drum not being rigidly supported or positively driven any tendency of it to move up or down or in any direction in relation to its longitudinal axis would cause the distance between the bottom of the back wall 32 of the hopper and the surface 8 of the drum to vary and this would result in allowing some of the unexpressed material to fall to the trough 44 along with the juice or expressed material, or permit material to drop into said trough without having been strained by the perforated rear wall of the hopper.

A scraper 40, urged by a spring 41, bears against the surface of the drum, below and in front of the expressing roll, and another scraper 42, urged by a spring 43 and located over the scraper 40, bears upon the surface of the expressing roll. The juice or liquid which passes backward over the forwardly turning drum may be received and directed by a suitable trough 44.

In the operation of the machine the drum and the expressing roll are driven in opposite directions, the convex side of the drum passing beneath the hopper and carrying material placed therein to the expressing roll, between which and the drum the material is squeezed and crushed and substantially freed of its liquid content. The squeezed or desiccated material passes onward between the compression agencies and out over the chute 45, formed in continuation with the scraper 40. The liquid passes rearward over the drum, as heretofore described. The hopper may be thrown up from time to time for the purpose of clearing the machine. The driving shaft of the machine may be operated manually by a hand crank 46, as shown, or the shaft may be provided with a pulley for driving by power.

I claim:

1. An expressing machine comprising a frame, a drum or cylinder, means frictionally contacting with the drum for freely supporting the drum in said frame, so that it will rotate about its horizontal axis, a hopper mounted over the top region of the drum on a pivot enabling it to be swung away from the drum, means on said hopper whereby its position is always maintained in the same relation to the drum, an expressing roll journaled in movable bearings in the frame to bear upon the upper side of the drum below and in front of the top as the drum is driven, pressure means for said roll, and means for driving the drum and roll in opposite directions, the parts being so arranged that the expressed liquid escapes backward over the top of the drum.

2. An expressing machine comprising a drum or cylinder of large diameter, having a solid periphery and lateral flanges thereon, said drum or cylinder adapted to receive the material to be compressed upon its upper convex side, an expressing roll of comparatively small diameter bearing upon the upper side of the drum a comparatively short distance below and in front of the top as the drum is driven, the arrangement being such that the expressed liquid escapes backward over the top of the drum, and a hopper over the top region of the drum being the expressing roll and entering between the flanges of the drum or cylinder, said hopper being pivoted to the frame so as to enable it to swing about said pivot upon movement of the drum whereby said hopper is retained in operative engagement with the drum, said hopper having means carried by the back wall thereof whereby said hopper may be adjusted in varying proximity to the convex surface of the drum and means including the expressing roll for frictionally slowly rotating the large diameter drum, so that the material is slowly passed to the expressing roll.

3. An expressing machine comprising, a frame, a drum or cylinder adapted to receive the material to be expressed upon its upper convex side, means, including a plurality of rollers for frictionally contacting with the cylinder of the drum for freely supporting the drum on its cylinder in said frame, so that it will rotate about its horizontal axis, a hopper pivoted on the frame and riding on the drum, and an expressing roll bearing on the convex surface of the drum in front of the hopper.

4. An expressing machine comprising, a frame, a drum or cylinder freely supported in said frame and adapted to receive the material to be expressed upon its upper convex side, a hopper pivoted on the frame and riding on the drum, said hopper having its back wall adjustable in varying proximity to the drum, an expressing roll bearing on the convex of the drum in front of the hopper, means for driving said expressing roll to frictionally drive the drum.

VIKTOR LORCZAK.